United States Patent
Yanagisawa

(10) Patent No.: US 12,009,704 B2
(45) Date of Patent: Jun. 11, 2024

(54) ACTUATOR, COIL AND ADHESIVE LAYER

(71) Applicant: NIDEC SANKYO CORPORATION, Nagano (JP)

(72) Inventor: Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 149 days.

(21) Appl. No.: 17/707,959

(22) Filed: Mar. 30, 2022

(65) Prior Publication Data
US 2022/0320930 A1  Oct. 6, 2022

(30) Foreign Application Priority Data

Apr. 2, 2021 (JP) ................................. 2021-063219

(51) Int. Cl.
*H02K 1/34* (2006.01)
*H01F 7/18* (2006.01)
*H02K 33/18* (2006.01)

(52) U.S. Cl.
CPC ................. *H02K 1/34* (2013.01); *H01F 7/18* (2013.01); *H02K 33/18* (2013.01); *H02K 2211/03* (2013.01)

(58) Field of Classification Search
CPC ...... H02K 1/34; H02K 33/18; H02K 2211/03; H02K 33/16; H02K 3/28; H01F 7/18; H01F 7/1615
See application file for complete search history.

(56) References Cited

U.S. PATENT DOCUMENTS

2019/0190365 A1\*  6/2019  Takeda .................... H02K 33/18
2020/0204054 A1\*  6/2020  Mori ........................ H02K 33/02

FOREIGN PATENT DOCUMENTS

JP          2020102902        7/2020
WO    WO-2010026883 A1 \*  3/2010  ............. B06B 1/045

\* cited by examiner

*Primary Examiner* — Bernard Rojas
(74) *Attorney, Agent, or Firm* — JCIPRNET

(57) ABSTRACT

An actuator includes a movable body having a magnet, a support body having a coil, and a power feeding board with which two lead-out wires extended from a winding part of the coil are connected. The coil includes a first air core coil and a second air core coil. The first air core coil has a first winding part, a first inner side lead-out wire, and a first outer side lead-out wire. The second air core coil has a second winding part whose winding direction is the same as the first winding part and which is overlapped with the first winding part, a second inner side lead-out wire which is extended from the second winding part and whose tip end portion is electrically connected with a tip end portion of the first inner side lead-out wire, and a second outer side lead-out wire extended from the second winding part.

3 Claims, 10 Drawing Sheets

# ACTUATOR, COIL AND ADHESIVE LAYER

CROSS REFERENCE TO RELATED APPLICATION

The present invention claims priority under 35 U.S.C. § 119 to Japanese Application No. 2021-063219 filed Apr. 2, 2021, the entire content of which is incorporated herein by reference.

TECHNICAL FIELD

At least an embodiment of the present invention may relate to an actuator structured to move a movable body by a magnetic drive mechanism including a magnet and a coil. Further, at least an embodiment of the present invention may relate to a coil which is used in the magnetic drive mechanism.

BACKGROUND

As a device for notifying information by vibration, an actuator has been proposed which is structured to vibrate a movable body supported in a support body by a magnetic drive mechanism. An actuator disclosed in Japanese Patent Laid-Open No. 2020-102902 (Patent Literature 1) includes a movable body, a support body, a connection body which relatively movably connects the movable body with the support body, and a magnetic drive mechanism structured to relatively move the movable body and the support body. The movable body includes a magnet. The support body includes a coil, a coil holder which holds the coil, and a power feeding circuit board which is fixed to the coil holder. The magnet and the coil face each other in a thickness direction of a winding part of the coil to structure the magnetic drive mechanism. A center hole of the winding part opens in a facing direction in which the magnet and the coil face each other. A coil wire which is extended from the winding part is connected with the power feeding circuit board which is disposed on an outer side in a radial direction of the winding part.

A coil is commonly manufactured so that a coil wire is wound around in a height direction on an outer peripheral side of a jig for determining a shape of a center hole. Therefore, when the coil has been completed, a winding start portion of the coil wire is located on an inner peripheral side of the winding part, and a winding end portion is located on an outer peripheral side of the winding part. Therefore, when a coil is to be connected with a power feeding circuit board, the winding end portion is capable of connecting with the power feeding circuit board by extending as it is. However, the winding start portion is required to be extended from an inner peripheral side of the winding part to its outer peripheral side along a surface of the winding part and then, connected with the power feeding circuit board.

In a magnetic drive mechanism, when a gap space between the winding part of the coil and a magnet is set to be narrow, thrust for relatively moving a support body and a movable body can be increased. However, in a case that the winding start portion of the coil wire is extended along a surface of the winding part for connecting the coil with the power feeding circuit board, a gap space between the surface of the winding part and the magnet becomes large by an amount of the winding start portion of the coil wire.

SUMMARY

At least an embodiment of the present invention may advantageously provide an actuator including a coil which is not required to extend a coil wire along a surface of a winding part for leading out an end part of the coil wire to an outer peripheral side with respect to the winding part. Further, at least an embodiment of the present invention may advantageously provide a coil which is not required to extend an end part of a coil wire along a surface of a winding part for leading out the end part of the coil wire to an outer peripheral side with respect to the winding part.

According to at least an embodiment of the present invention, there may be provided an actuator including a movable body having a magnet, a support body having a coil, a coil holder which holds the coil, and a power feeding board with which two lead-out wires extended from a winding part of the coil are connected on an outer peripheral side with respect to the coil, a connection body which relatively movably connects the movable body with the support body, and a magnetic drive mechanism having the magnet and the coil to relatively move the movable body and the support body. The magnet faces the coil in a thickness direction of the winding part. The coil includes a first air core coil having a first winding part, a first inner side lead-out wire extended from the first winding part to an inner peripheral side, and a first outer side lead-out wire extended from the first winding part to an outer side, and a second air core coil having a second winding part whose winding direction is the same as the first winding part and which is overlapped with the first winding part, a second inner side lead-out wire which is extended from the second winding part to an inner peripheral side and whose tip end portion is electrically connected with a tip end portion of the first inner side lead-out wire, and a second outer side lead-out wire extended from the second winding part to an outer side. The winding part includes the first winding part and the second winding part, and the first outer side lead-out wire and the second outer side lead-out wire are the two lead-out wires.

According to at least an embodiment of the present invention, the coil includes the first air core coil and the second air core coil. The first winding part of the first air core coil and the second winding part of the second coil are overlapped with each other in a state that their winding directions are the same as each other to structure the winding part of the coil. Further, a tip end portion of the first inner side lead-out wire extended from the first winding part of the first air core coil to an inner peripheral side and a tip end portion of the second inner side lead-out wire extended from the second winding part of the second air core coil to an inner peripheral side are electrically connected with each other. As a result, the coil includes, as the two lead-out wires, the first outer side lead-out wire extended from the first winding part to an outer peripheral side and the second outer side lead-out wire extended from the second winding part to an outer peripheral side. Therefore, when two coil wires extended from the winding part are to be connected with a power feeding board located on an outer peripheral side with respect to the winding part, the coil wire is not required to extend along a surface of the winding part. Accordingly, the surface of the winding part and the magnet can be easily approached each other and thus, large thrust relatively moving the movable body and the support body is easily obtained by a magnetic drive mechanism structured of the coil and the magnet. Further, the surface of the winding part and the magnet can be easily approached each other and thus, a size of the device in a thickness direction of the coil where the coil and the magnet face each other can be reduced. In addition, the first air core coil and the second air core coil are structured so that a tip end portion of the first inner side lead-out wire extended from the first winding part to an inner peripheral side and a tip end portion of the second inner side lead-out wire extended from the second winding part to an inner peripheral side are electrically connected with each other. As a result, a length dimension of the first inner side lead-out wire and a length dimension of the second inner side lead-out wire can be sufficiently secured and thus, the first inner side lead-out wire and the second inner side lead-out wire are easily electrically connected with each other.

In at least an embodiment of the present invention, it may be structured that the actuator includes an adhesive layer having a filling part which is filled in an inner side of the first air core coil and in an inside of the second air core coil, and a coil adhesion part which exists between the first air core coil and the second air core coil to adhesively bond the first air core coil to the second air core coil, and the first inner side lead-out wire and the second inner side lead-out wire are sealed in an inside of the filling part. According to this structure, the first air core coil and the second air core coil are fixed and integrated with each other by the adhesive layer. Further, the first inner side lead-out wire and the second inner side lead-out wire whose tip end portions are connected with each other are sealed in the inside of the adhesive layer. Therefore, even when the movable body and the support body are relatively moved to generate vibration, the first inner side lead-out wire and the second inner side lead-out wire are prevented from going out from the center hole of the winding part of the coil.

In at least an embodiment of the present invention, it may be structured that the adhesive layer includes a winding part fixing part which exists between the winding part and the coil holder to fix the coil to the coil holder. According to this structure, sealing of the first inner side lead-out wire and the second inner side lead-out wire in the inside of the adhesive layer, fixing of the first air core coil and the second air core coil, and fixing of the winding part of the coil to the coil holder can be performed by the adhesive layer.

In at least an embodiment of the present invention, it may be structured that the first air core coil and the second air core coil are the same air core coil. According to this structure, a number of components of the air core coil structuring the coil can be reduced.

In at least an embodiment of the present invention, it may be structured that the power feeding board includes a first power feeding board and a second power feeding board which is disposed on an opposite side to the first power feeding board with respect to the winding part, and the first outer side lead-out wire is connected with the first power feeding board, and the second outer side lead-out wire is connected with the second power feeding board. In other words, when the first air core coil and the second air core coil are respectively turned around the center hole, two lead-out wires extended from the coil can be extended in different directions. Therefore, the first power feeding board and the second power feeding board which are disposed on both sides of the winding part of the coil are easily connected with the respective lead-out wires.

Further, according to at least an embodiment of the present invention, there may be provided a coil including a winding part and two lead-out wires extended from the winding part. The coil includes a first air core coil having a first winding part, a first inner side lead-out wire extended from the first winding part to an inner peripheral side, and a first outer side lead-out wire extended from the first winding part to an outer side, and a second air core coil having a second winding part whose winding direction is the same as the first winding part and which is overlapped with a thickness direction of the first winding part, a second inner side lead-out wire which is extended from the second winding part to an inner peripheral side and whose tip end portion is electrically connected with a tip end portion of the first inner side lead-out wire, and a second outer side lead-out wire extended from the second winding part to an outer side, and an adhesive layer which exists between the first air core coil and the second air core coil to adhesively bond the first air core coil to the second air core coil. The winding part includes the first winding part and the second winding part, and the first outer side lead-out wire and the second outer side lead-out wire are the two lead-out wires.

The coil in accordance with at least an embodiment of the present invention includes, as the two lead-out wires, the first outer side lead-out wire and the second outer side lead-out wire which are extended from the winding part to an outer peripheral side. Therefore, when two coil wires extended from the winding part are to be connected with a power feeding board located on an outer peripheral side with respect to the winding part, the coil wire is not required to extend along a surface of the winding part.

In at least an embodiment of the present invention, it may be structured that the adhesive layer includes a filling part which is filled in an inner side of the first air core coil and in an inner side of the second air core coil, and the first inner side lead-out wire and the second inner side lead-out wire are sealed in an inside of the filling part. According to this structure, the first air core coil and the second air core coil are fixed and integrated with each other by the adhesive layer. Further, the first inner side lead-out wire and the second inner side lead-out wire whose tip end portions are connected with each other are sealed in the inside of the adhesive layer.

Effects of the Invention

In the actuator in at least an embodiment of the present invention, when end parts of two coil wires are to be connected with a power feeding board located on an outer peripheral side, the coil wire is not required to extend along a surface of the winding part. As a result, the surface of the winding part and the magnet can be easily approached each other and thus, large thrust relatively moving the movable body and the support body is easily obtained by a magnetic drive mechanism structured of the coil and the magnet. Further, the surface of the winding part and the magnet can be easily approached each other and thus, a size of the device in a thickness direction of the coil where the coil and the magnet face each other can be reduced.

According to the coil in at least an embodiment of the present invention, when end parts of two coil wires are to be extended to an outer peripheral side with respect to the winding part, the coil wire is not required to extend along a surface of the winding part. Further, the first air core coil and the second air core coil which structure the coil are provided with lead-out wires extended from the respective winding parts to an inner peripheral side, and tip end portions of the respective lead-out wires are electrically connected with each other. Therefore, a length dimension of the first inner side lead-out wire and a length dimension of the second inner side lead-out wire can be sufficiently secured and thus, the first inner side lead-out wire and the second inner side lead-out wire are easily electrically connected with each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

(Entire Structure)

Figure 1:
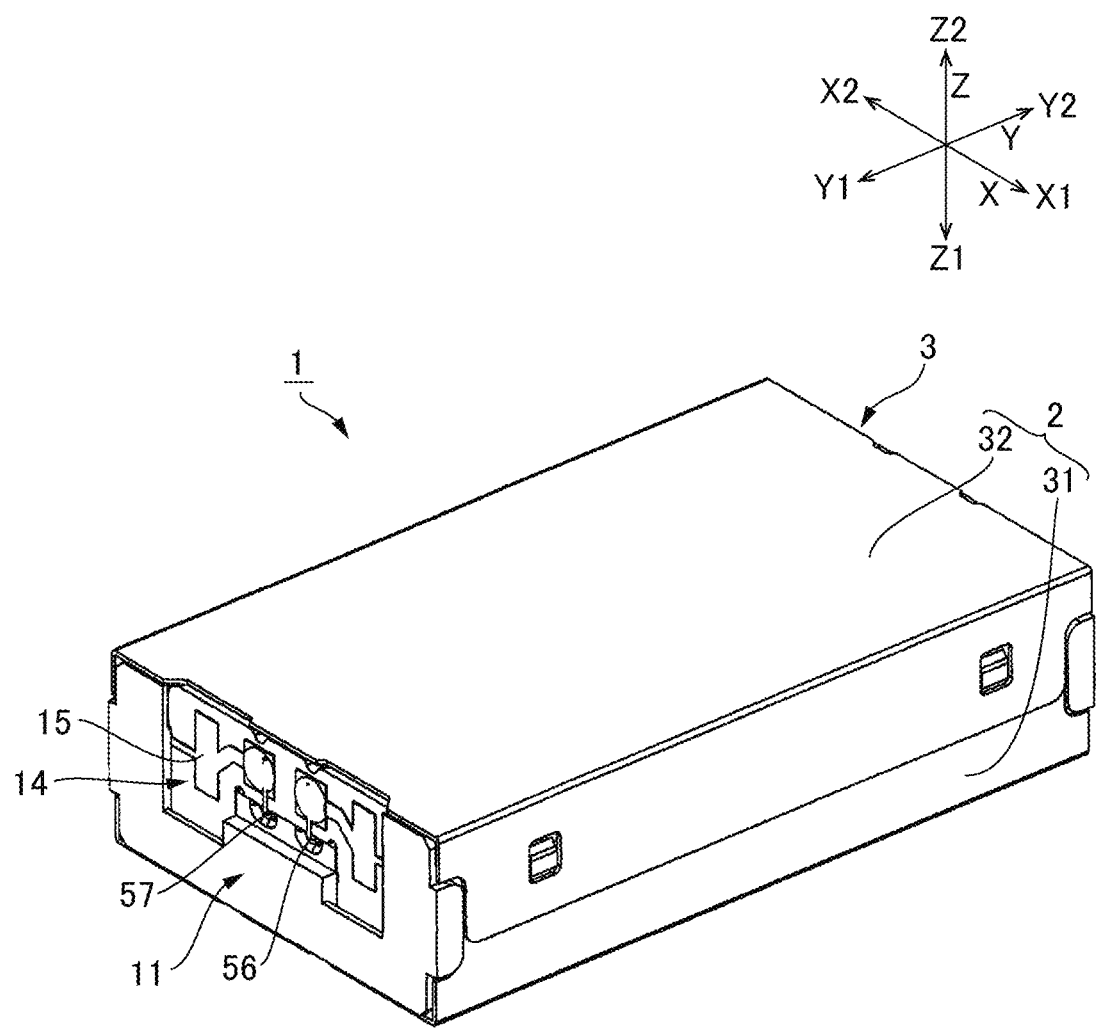
FIG. 1 is a perspective view showing an actuator to which the present invention is applied.
Figure 2:
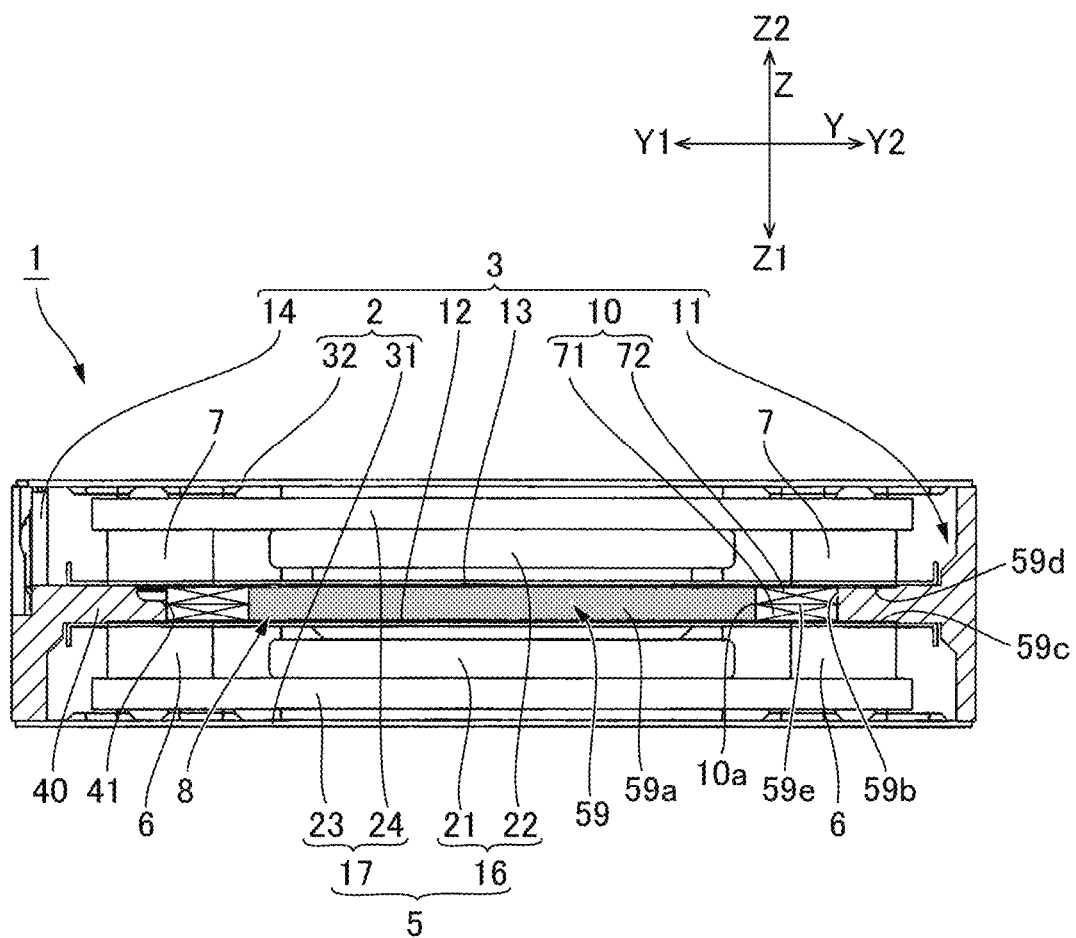
FIG. 2 is a cross-sectional view showing an actuator which is cut in a longitudinal direction.
Figure 3:
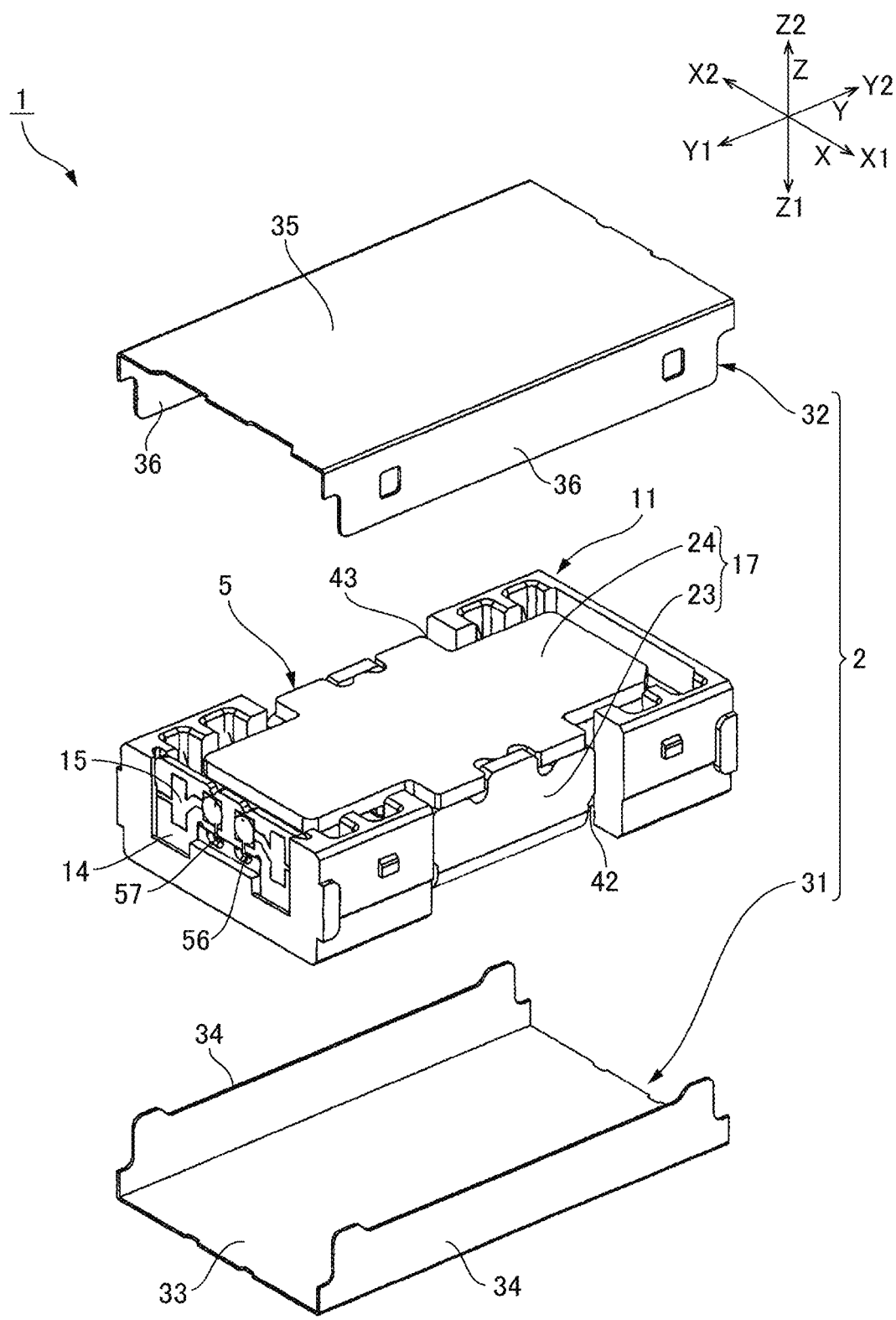
FIG. 3 is an exploded perspective view showing an actuator.
Figure 4:
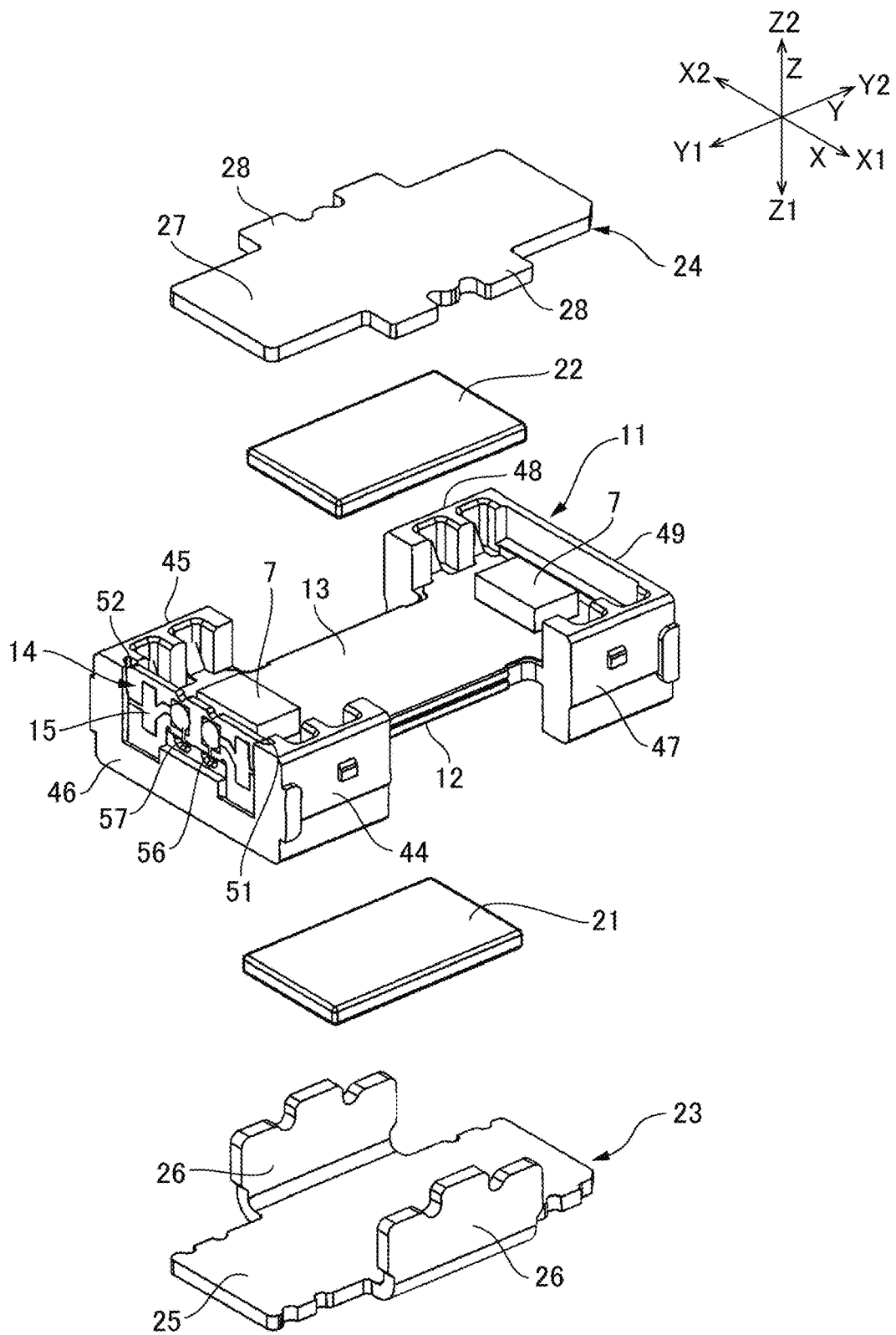
FIG. 4 is an exploded perspective view showing an actuator in which a case is detached.

FIG. 1 is a perspective view showing an actuator to which the present invention is applied. FIG. 2 is a cross-sectional view showing an actuator which is cut in a longitudinal direction. FIG. 3 is an exploded perspective view showing an actuator. FIG. 4 is an exploded perspective view showing an actuator in which a case is detached.

An actuator 1 in this embodiment is used as a tactile device for transmitting information by vibration. As shown in FIG. 1, the actuator 1 is provided with an outward appearance in a rectangular prism shape. The actuator 1 generates vibration in a shorter direction in the outward appearance. In the following descriptions, a shorter direction in which vibration is generated is referred to as an "X" direction, and a longitudinal direction of the actuator 1 which is a direction perpendicular to the "X" direction is referred to as a "Y" direction. Further, in the following descriptions, a thickness direction of the actuator 1 which is a direction perpendicular to the "X" direction and the "Y" direction is referred to as a "Z" direction. Further, one side in the "X" direction is referred to as an "X1" direction side and the other side is referred to as an "X2" direction side. One side in the "Y" direction is referred to as a "Y1" direction side and the other side is referred to as a "Y2" direction side. One side in the "Z" direction is referred to as a "Z1" direction side and the other side is referred to as a "Z2" direction side.

As shown in FIG. 2, the actuator 1 includes a support body 3 having a case 2 which forms an outer shape, and a movable body 5 which is accommodated in an inside of the case 2. Further, the actuator 1 includes connection bodies 6 and 7 which connect the support body 3 with the movable body 5 relatively movably in the "X" direction, and a magnetic drive mechanism 8 structured to relatively move the movable body 5 and support body 3 in the "X" direction.

The support body 3 includes a coil 10, a coil holder 11 which holds the coil 10, a first plate 12 overlapped with the coil holder 11 on the "Z1" direction side, and a second plate 13 overlapped with the coil holder 11 on the "Z2" direction side. A thickness direction of the coil 10 is directed in the "Z" direction. The coil 10 is located at a center in the "Z" direction in an inside of the case 2. Further, the support body 3 includes a power feeding circuit board 14 (power feeding board) which is held by an end face on the "Y1" direction side of the coil holder 11. Electric power is supplied to the coil 10 through the power feeding circuit board 14.

The movable body 5 includes a magnet 16 and a yoke 17. The magnet 16 faces the coil 10 of the support body 3 in the "Z" direction. The coil 10 and the magnet 16 structure the magnetic drive mechanism 8. The connection body 6 and the connection body 7 are respectively members in a rectangular prism shape. Each of the connection body 6 and the connection body 7 is provided with at least one of elasticity and viscoelasticity.

(Movable Body)

As shown in FIGS. 2 and 4, the movable body 5 includes a first magnet 21 and a second magnet 22 as the magnet 16. The first magnet 21 is located on the "Z1" direction side with respect to the coil 10. The second magnet 22 is located on the "Z2" direction side with respect to the coil 10. Each of the first magnet 21 and the second magnet 22 is polarized into two portions in the "X" direction. A magnetized polarizing line of the first magnet 21 is extended in the "Y" direction at a center in the "X" direction. A magnetized polarizing line of the second magnet 22 is extended in the "Y" direction at a center in the "X" direction.

The yoke 17 is made of magnetic material. The yoke 17 is structured by assembling two members, i.e., a first yoke 23 and a second yoke 24. The first yoke 23 is provided with a first plate part 25 in a flat plate shape which is long in the "Y" direction, and a pair of connection plate parts 26 which are curved to the "Z2" direction side from a center portion in the "Y" direction toward an outer side in the "X" direction and extended to the "Z2" direction side at both end edges in the "Y" direction of the first plate part 25. The first magnet 21 is held by a face on the "Z2" direction side of the first plate part 25. The second yoke 24 is provided with a second plate part 27 which faces the first plate part 25 in the "Z" direction, and a pair of projecting parts 28 which are projected to the "X1" direction side and to the other "X2" direction side from an intermediate portion in the "Y" direction of the second plate part 27. The second magnet 22 is held by a face on the "Z1" direction side of the second plate part 27. A pair of the projecting parts 28 of the second yoke 24 are joined to tip end portions on the "Z2" direction side of a pair of the connection plate parts 26 by a method such as welding. As a result, the first yoke 23 and the second yoke 24 are integrated with each other as one body to structure the yoke 17.

(Support Body)

Figure 5:
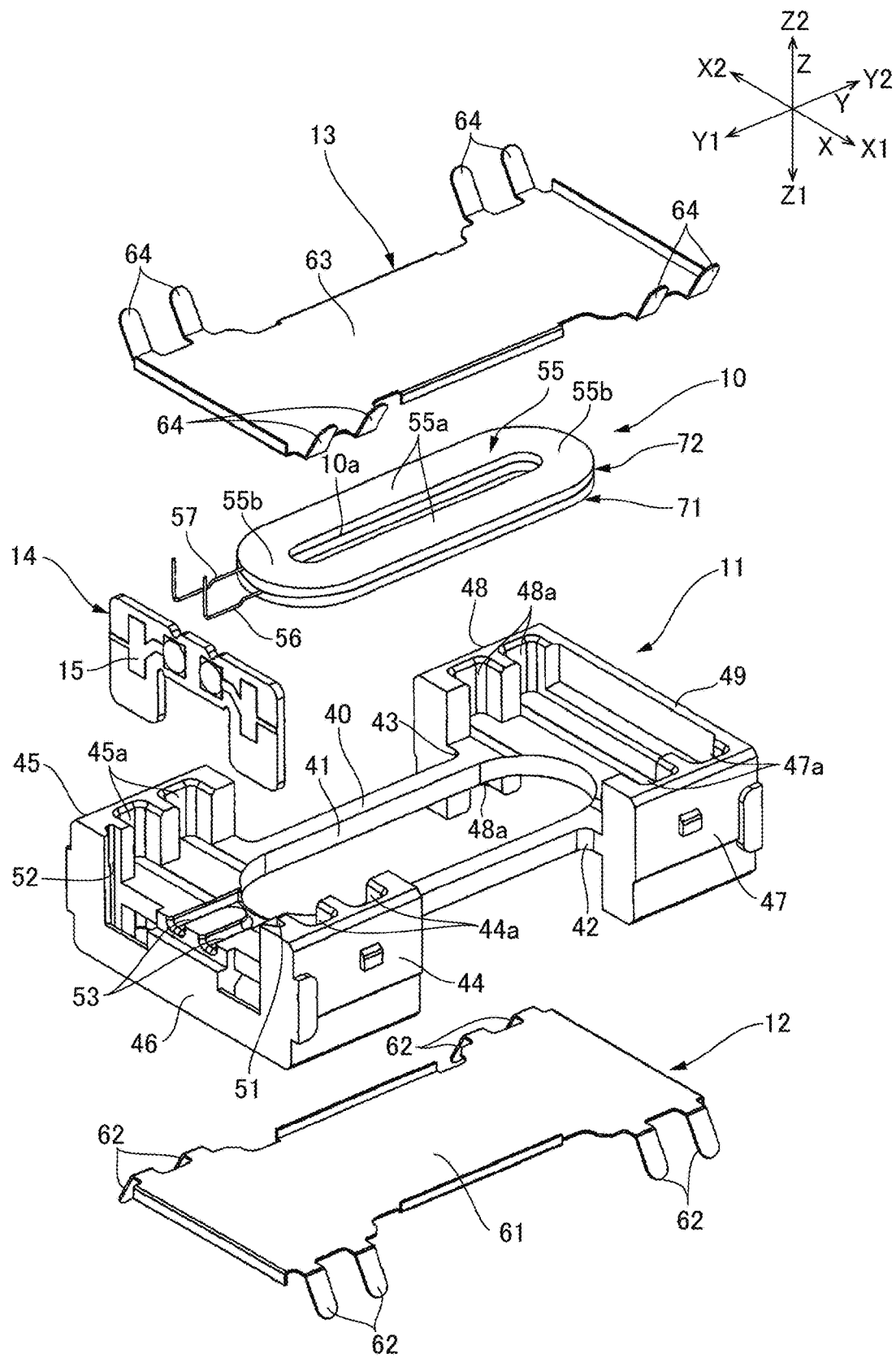
FIG. 5 is an exploded perspective view showing a support body in which a case is detached.
Figure 6:
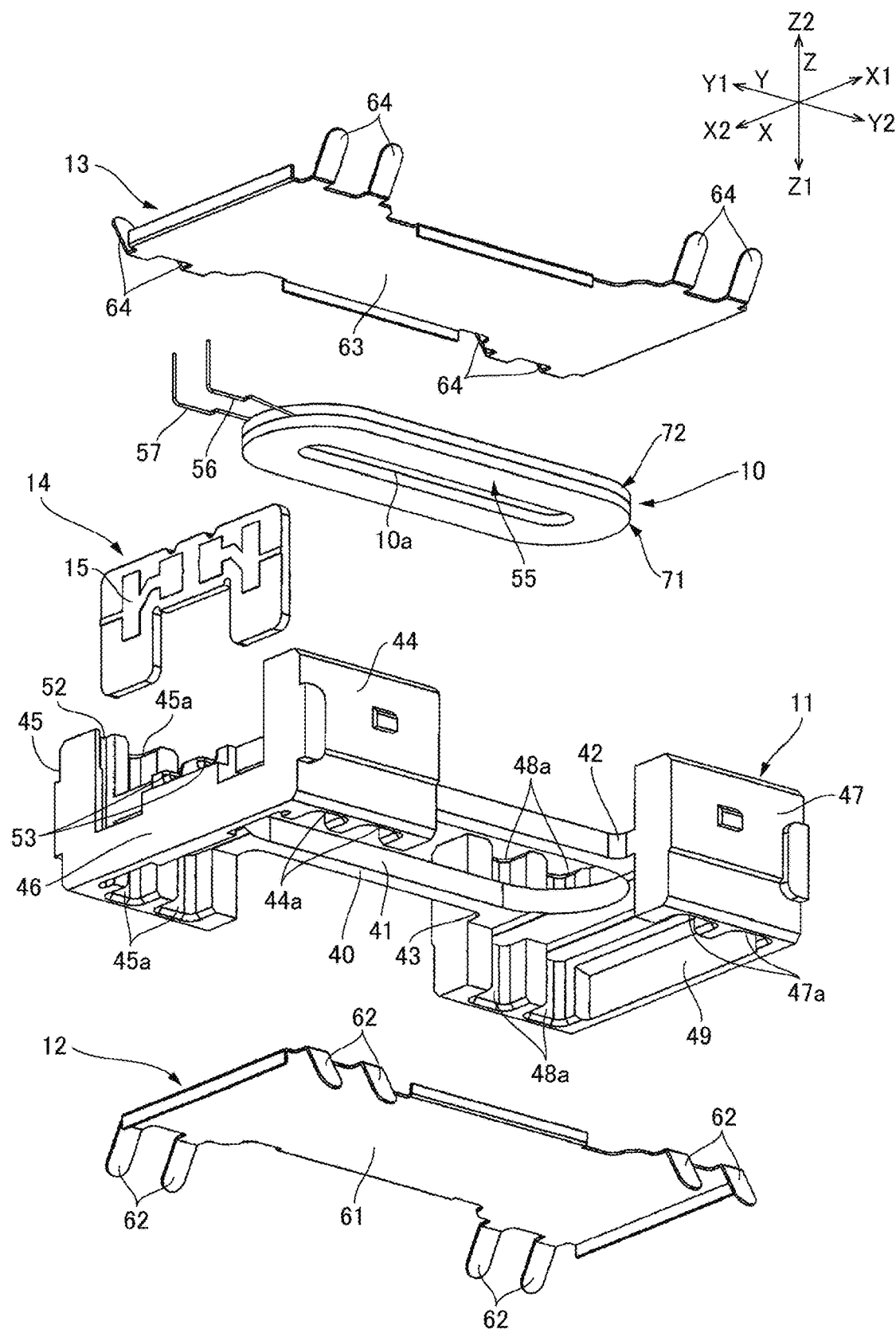
FIG. 6 is an exploded perspective view showing a support body in which a case is detached and which is viewed from an opposite side to FIG. 5.
Figure 7:
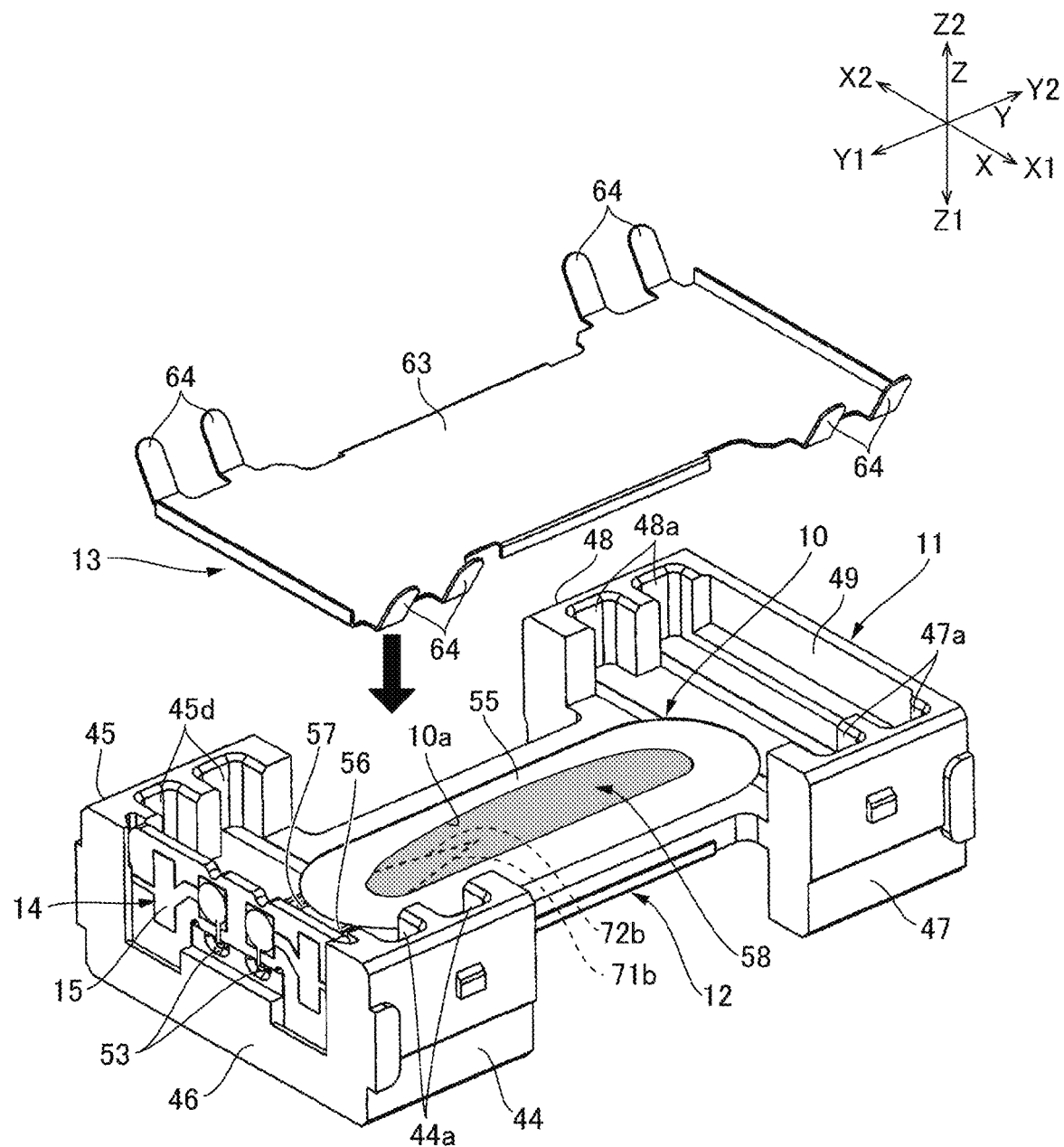
FIG. 7 is an explanatory view showing a fixing method of a coil to a coil holder.

FIG. 5 is an exploded perspective view showing the support body 3 in which a case is detached. FIG. 6 is an exploded perspective view showing the support body 3 in which a case is detached and which is viewed from an opposite side to FIG. 5. FIG. 5 is a view showing the support body 3 which is viewed from the "Z2" direction side, and FIG. 6 is a view showing the support body 3 which is viewed from the "Z1" direction side. FIG. 7 is an explanatory view showing a fixing method of the coil 10 to the coil holder 11.

As shown in FIGS. 1 and 2, the case 2 includes a first case member 31 and a second case member 32 which are overlapped with each other in the "Z" direction. The first case member 31 is attached to the coil holder 11 from the "Z1" direction side. The second case member 32 is attached to the coil holder 11 from the "Z2" direction side. As shown in FIG. 3, the first case member 31 is provided with a first plate part 33 in a rectangular shape, and a pair of side plate parts 34 which are extended to the "Z2" direction side from both end edges in the "X" direction of the first plate part 33. A pair of the side plate parts 34 are located on both sides in the "X" direction of the coil holder 11. The second case member 32 is provided with a second plate part 35 in a rectangular shape and a pair of side plate parts 36 which are extended to the "Z1" direction side from both end edges in the "X" direction of the second plate part 35. A pair of the side plate parts 36 are located on both sides in the "X" direction of the coil holder 11.

As shown in FIGS. 5 and 6, a contour shape of the coil holder 11 when viewed in the "Z" direction is a rectangular shape which is long in the "Y" direction. The coil holder 11 is provided with a plate part 40 which is extended in the "Y" direction at a center in the "X" direction. A coil arrangement hole 41 is provided at a center of the plate part 40. The coil arrangement hole 41 is a through hole in an elliptical shape which is long in the "Y" direction. Further, the coil holder 11 is provided with cut-out parts 42 and 43 which are formed by cutting out a center portion in the "Y" direction of the plate part 40 to an inner side.

Further, the coil holder 11 is provided, on the "Y1" direction side with respect to the cut-out parts 42 and 43, with a side plate part 44, which is protruded to the "Z1" direction side and to the "Z2" direction side from an edge on the "X1" direction side of the plate part 40, and a side plate part 45 which is protruded to the "Z1" direction side and to the "Z2" direction side from an edge on the "X2" direction side of the plate part 40. An opposing face of the side plate part 44 to the side plate part 45 is provided with a plurality of groove parts 44a which are extended to the "Z1" direction side and to the "Z2" direction side from the plate part 40. Further, an opposing face of the side plate part 45 to the side plate part 44 is provided with a plurality of groove parts 45a which are extended to the "Z1" direction side and to the "Z2" direction side from the plate part 40. In addition, the coil holder 11 is provided with a side plate part 46 which is protruded to the "Z1" direction side from an end edge on the "Y1" direction side of the plate part 40 and connects an end on the "Y1" direction side of the side plate part 44 with an end on the "Y1" direction side of the side plate part 45.

Further, the coil holder 11 is provided, on the "Y2" direction side with respect to the cut-out parts 42 and 43, with a side plate part 47, which is protruded to the "Z1" direction side and to the "Z2" direction side from an edge on the "X1" direction side of the plate part 40, and a side plate part 48 which is protruded to the "Z1" direction side and to the "Z2" direction side from an edge on the "X2" direction side of the plate part 40. In addition, the coil holder 11 is provided with a side plate part 49 which is protruded to the "Z1" direction side and to the "Z2" direction side from an end edge on the "Y2" direction side of the plate part 40 and connects an end on the "Y2" direction side of the side plate part 47 with an end on the "Y2" direction side of the side plate part 48. An opposing face of the side plate part 47 to the side plate part 48 is provided with a plurality of groove parts 47a which are extended to the "Z1" direction side and to the "Z2" direction side from the plate part 40. Further, an opposing face of the side plate part 48 to the side plate part 47 is provided with a plurality of groove parts 48a which are extended to the "Z1" direction side and to the "Z2" direction side from the plate part 40.

Further, the coil holder 11 is, as shown in FIG. 5, provided with a pair of slits 51 and 52 at end parts on the "Y1" direction side of the side plate parts 44 and 45 facing each other in the "X" direction. Each of a pair of the slits 51 and 52 is extended in the "Z" direction. An end on the "Z2" direction side of each of a pair of the slits 51 and 52 is opened. In addition, the coil holder 11 is provided with two guide grooves 53, which are extended in parallel with each other from the coil arrangement hole 41 to the "Y1" direction side, on a face on the "Z2" direction side of the plate part 40.

In this embodiment, the coil 10 is provided with a winding part 55 which is formed by winding a coil wire in an elliptical shape, and a first outer side lead-out wire 56 and a second outer side lead-out wire 57 which are extended to the "Y1" direction side from an outer peripheral side of the winding part 55. The winding part 55 is provided with two effective side portions 55a, which are extended in the "Y" direction and are arranged in parallel with each other in the "X" direction, and two curved side portions 55b in a circular arc shape each of which connects both ends in the "Y" direction of the two effective side portions 55a with each other. The winding part 55 is accommodated in the coil arrangement hole 41. Each of the first outer side lead-out wire 56 and the second outer side lead-out wire 57 is routed in an inside of each of the guide grooves 53 from the coil arrangement hole 41. The coil 10 is fixed to the coil holder 11 by an adhesive layer 59 shown in FIG. 2. As the details will be described later, as shown in FIGS. 2, 5 and 6, the coil 10 is provided with a first air core coil 71 and a second air core coil 72 which are overlapped with each other in the "Z" direction.

As shown in FIGS. 4 and 5, the power feeding circuit board 14 is held by the coil holder 11 by utilizing a pair of the slits 51 and 52 provided at an end on the "Y1" direction side of the coil holder 11. In other words, end edges on both sides in the "X" direction of the power feeding circuit board 14 are respectively fitted into the slits 51 and 52 from the "Z2" direction side. As a result, the power feeding circuit board 14 is supported by an opening edge of an opening part of the coil holder 11 which is surrounded by the side plate part 44, the side plate part 45 and the side plate part 46 on the "Y1" direction side. The power feeding circuit board 14 is supported so that its board surface formed with a wiring pattern 15 faces toward the "Y1" direction side. The power feeding circuit board 14 is fixed to the coil holder 11 by an adhesive.

In this embodiment, as shown in FIG. 7, the first outer side lead-out wire 56 extended from the winding part 55 of the coil 10 to the "Y1" direction side along the guide groove 53 is bent to the "Z2" direction side and is electrically connected with the power feeding circuit board 14. Further, the second outer side lead-out wire 57 extended from the winding part 55 of the coil 10 to the "Y1" direction side along the guide groove 53 is bent to the "Z2" direction side and is electrically connected with the power feeding circuit board 14.

As shown in FIGS. 5 and 6, the first plate 12 is provided with a first plate part 61 in a rectangular shape which covers the plate part 40 from the "Z1" direction side, and a plurality of first claw parts 62 which are obliquely protruded to the "Z1" direction side and toward an outer side in the "X" direction from both sides in the "X" direction of the first plate part 61. The first claw parts 62 are respectively inserted into a groove part 44a provided in the side plate part 44, a groove part 45a provided in the side plate part 45, a groove part 47a provided in the side plate part 47, and a groove part 48a provided in the side plate part 48 from the "Z2" direction side. When the first plate 12 is contacted with the plate part 40 of the coil holder 11 from the "Z1" direction side, the first claw parts 62 are set in a state that they are elastically abutted with the side plate part 44, the side plate part 45, the side plate part 47 and the side plate part 48.

Further, the second plate 13 is provided with a second plate part 63 in a rectangular shape which covers the plate part 40 from the "Z2" direction side, and a plurality of second claw parts 64 which are obliquely protruded to the "Z2" direction side and toward an outer side in the "X" direction from both sides in the "X" direction of the second plate part 63. The second claw parts 64 are respectively inserted into a groove part 44a provided in the side plate part 44, a groove part 45a provided in the side plate part 45, a groove part 47a provided in the side plate part 47, and a groove part 48a provided in the side plate part 48. When the second plate 13 is contacted with the plate part 40 of the coil holder 11 from the "Z2" direction side, the second claw parts 64 are set in a state that they are elastically abutted with the side plate part 44, the side plate part 45, the side plate part 47 and the side plate part 48.

(Fixing of Coil to Coil Holder)

Next, a fixing method of the coil to the coil holder will be described below. As shown in FIG. 7, when the support body 3 is to be manufactured, the first plate 12 is overlapped with the plate part 40 of the coil holder 11 from the "Z1" direction side. Then, the first claw parts 62 of the first plate 12 are respectively inserted into the groove parts 44a, 45a, 47a and 48a provided in the side plate parts 44, 45, 47 and 48. As a result, the first plate 12 is supported by the coil holder 11 in a state that the first plate 12 closes the coil arrangement hole 41 from the "Z1" direction side.

Next, the winding part 55 of the coil 10 is disposed in the coil arrangement hole 41. Then, an adhesive 58 is filled in a center hole 10a of the winding part 55. After that, the second plate 13 is overlapped with the plate part 40 of the coil holder 11 from the "Z2" direction side, and the second claw parts 64 of the second plate 13 are respectively inserted into the groove parts 44a, 45a, 47a and 48a provided in the side plate parts 44, 45, 47 and 48. As a result, the second plate 13 is supported by the coil holder 11.

In this embodiment, the adhesive 58 filled in the center hole 10a of the winding part 55 enters between the winding part 55 and the first plate 12 on the "Z1" direction side of the winding part 55 to flow into a gap space between the first plate 12 and the plate part 40 of the coil holder 11 and reaches between the winding part 55 and an inner wall face of the coil arrangement hole 41. Further, the adhesive 58 enters between the winding part 55 and the second plate 13 on the "Z2" direction side of the winding part 55 to flow into a gap space between the second plate 13 and the plate part 40 of the coil holder 11 and reaches between the winding part 55 and the inner wall face of the coil arrangement hole 41.

Therefore, when the adhesive 58 is cured, as shown in FIG. 2, the winding part 55 is fixed to the inner wall face of the coil arrangement hole 41 in the plate part 40 of the coil holder 11 by the adhesive layer 59 which is a cured adhesive 58. Further, the first plate 12 is fixed to the plate part 40 of the coil holder 11 by the adhesive layer 59. In addition, the second plate 13 is fixed to the plate part 40 of the coil holder 11 by the adhesive layer 59. In other words, the adhesive layer 59 which is the cured adhesive 58 is provided with a filling part 59a in which the adhesive 58 is filled in the center hole 10a of the winding part 55, a winding part fixing part 59b which fixes the winding part 55 to the plate part 40 of the coil holder 11, a first plate fixing part 59c which fixes the first plate 12 to the plate part 40 of the coil holder 11, and a second plate fixing part 59d which fixes the second plate 13 to the plate part 40 of the coil holder 11.

(Connection Body)

As shown in FIGS. 2 and 4, each of the connection bodies 6 and 7 is formed in a rectangular prism shape which is extended long in the "X" direction. The connection body 6 is disposed between the first yoke 23 and the first plate 12. More specifically, the connection body 6 is structured of two members and is sandwiched at two positions, i.e., between end portions on the "Y1" direction side of the first yoke 23 and the first plate 12, and between end portions on the "Y2" direction side of the first yoke 23 and the first plate 12. The connection body 7 is disposed between the second yoke 24 and the second plate 13. More specifically, the connection body 7 is structured of two members and is sandwiched at two positions, i.e., between an end portion on the "Y1" direction side of the second yoke 24 and an end portion on the "Y1" direction side of the second plate 13, and between an end portion on the "Y2" direction side of the second yoke 24 and an end portion on the "Y2" direction side of the second plate 13. The connection bodies 6 and 7 are gel members made of silicone gel. Each of the connection body 6 and the connection body 7 is set in a compressed state in the "Z" direction between the support body 3 and the movable body 5.

In this embodiment, in a state that the movable body 5 is supported by the support body 3 through the connection bodies 6 and 7, the coil 10 is disposed between the first magnet 21 and the second magnet 22 in the "Z" direction. When this state is viewed in the "Z" direction, the effective side portions 55a of the winding part 55 face the first magnet 21 on the "Z1" direction side and face the second magnet 22 on the "Z2" direction side. Further, both end portions in the "Y" direction of the first plate part 25 of the first yoke 23 and the second plate part 27 of the second yoke 24 are disposed between the side plate part 44 and the side plate part 45 and between the side plate part 47 and the side plate part 48 of the coil holder 11 in the "X" direction. In addition, a pair of the connection plate parts 26 of the yoke 17 are located in the cut-out part 43 between the side plate part 44 and the side plate part 47 in the "Y" direction and in the cut-out part 44 between the side plate part 45 and the side plate part 48. The side plate part 44, the side plate part 45, the side plate part 47 and the side plate part 48 of the coil holder 11 function as abutting parts which restrict a movable range when the movable body 5 is moved in the "X" direction.

(Operation)

Wiring lines from a device on which the actuator 1 is mounted are connected with the wiring patterns 15 of the power feeding circuit board 14. In this embodiment, when an electric current is supplied to the coil 10 in a predetermined direction through the power feeding circuit board 14, the movable body 5 supported by the support body 3 is moved to one side in the "X" direction. After that, when a direction of the electric current is reversed, the movable body 5 is moved to the other side in the "X" direction. When a direction of the electric current supplied to the coil 10 is repeatedly reversed, the movable body 5 is vibrated.

(Detail of Coil)

Figure 8:
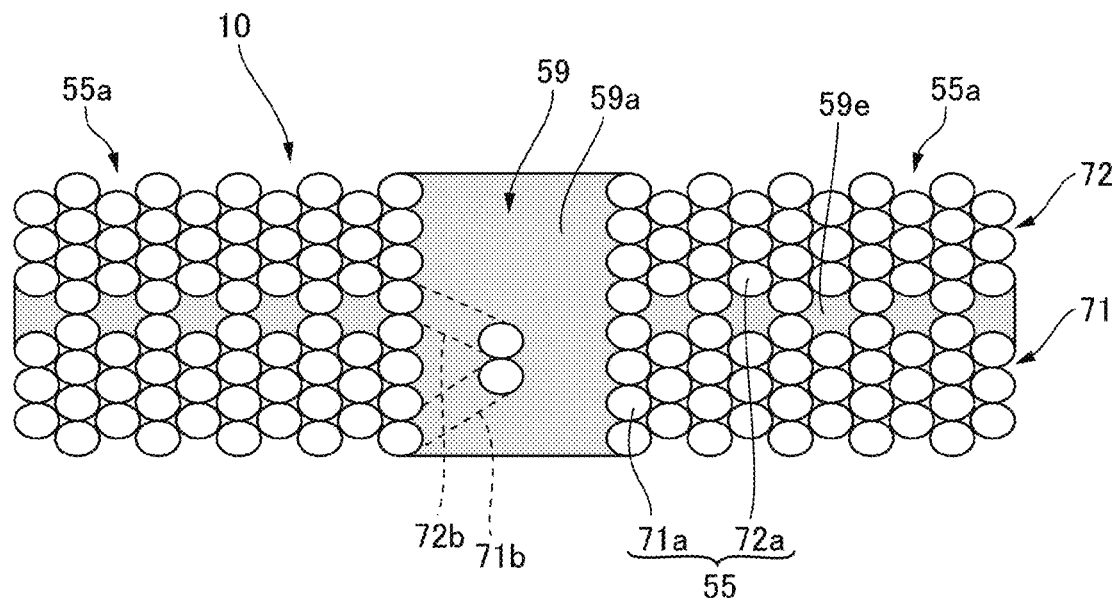
FIG. 8 is a cross-sectional view showing a coil.
Figure 9:
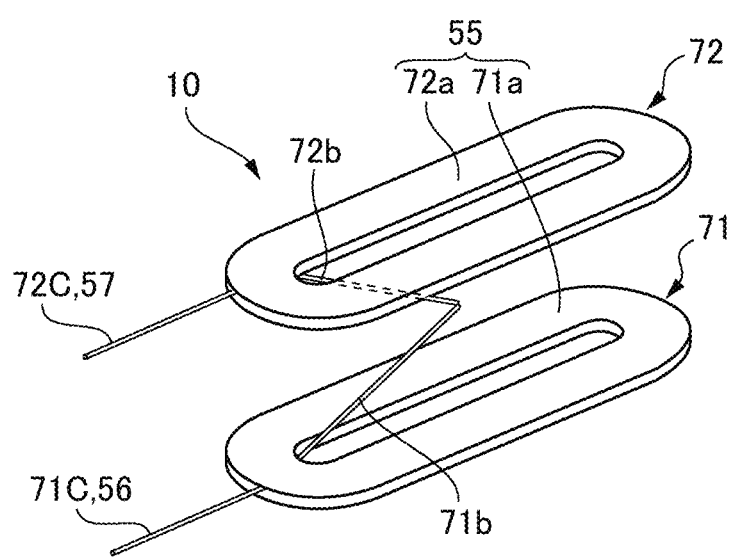
FIG. 9 is an exploded perspective view showing a coil.
Figure 9:
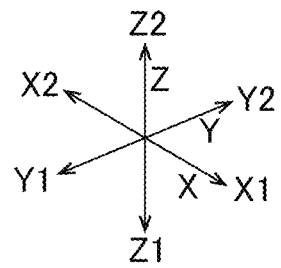

Next, detail of the coil 10 will be described below with reference to FIGS. 8 and 9. FIG. 8 is a cross-sectional view showing the coil 10 which is cut in the "X" direction. FIG. 9 is an exploded perspective view showing the coil 10.

The coil 10 is, as shown in FIG. 5, provided with the winding part 55 which is structured by winding a coil wire in an elliptical shape, and two lead-out wires (first outer side lead-out wire 56 and second outer side lead-out wire 57) which are extended from the winding part 55 to the "Y1" direction side. The winding part 55 is accommodated in the coil arrangement hole 41 provided in the plate part 40 of the coil holder 11 and is fixed to the coil holder 11 by the adhesive layer 59. The first outer side lead-out wire 56 and the second outer side lead-out wire 57 are connected with the power feeding circuit board 14 which is located on an outer peripheral side with respect to the winding part 55.

In this embodiment, the coil 10 includes the first air core coil 71 and the second air core coil 72. As shown in FIG. 9, the first air core coil 71 is provided with a first winding part 71a, a first inner side lead-out wire 71b which is extended to an inner peripheral side from the first winding part 71a, and a first outer side lead-out wire 71c which is extended to an outer side from the first winding part 71a. The second air core coil 72 is provided with a second winding part 72a, a second inner side lead-out wire 72b which is extended to an inner peripheral side from the second winding part 72a, and a second outer side lead-out wire 72c which is extended to an outer side from the second winding part 72a.

The second winding part 72a of the second air core coil 72 is overlapped with the first winding part 71a in the "Z" direction in a state that its winding direction is the same as the first winding part 71a. A tip end portion of the second inner side lead-out wire 72b which is extended to an inner peripheral side from the second winding part 72a is electrically connected with a tip end portion of the first inner side lead-out wire 71b which is extended to an inner peripheral side from the first winding part 71a of the first air core coil 71. The tip end portion of the second inner side lead-out wire 72b and the tip end portion of the first inner side lead-out wire 71b are connected with each other by soldering or thermal caulking. As a result, the coil 10 is provided with the first winding part 71a of the first air core coil 71 and the second winding part 72a of the second air core coil 72 as the winding part 55. Further, the coil 10 is provided with the first outer side lead-out wire 71c and the second outer side lead-out wire 72c which are extended to the "Y1" direction side from the winding part 55 as two lead-out wires (first outer side lead-out wire 56 and second outer side lead-out wire 57 of a coil wire) which are extended from the winding part 55.

In this embodiment, as shown in FIG. 7, when the support body 3 of the actuator 1 is to be structured, the adhesive 58 is filled in the center hole 10a of the winding part 55 of the coil 10. The adhesive 58 which is filled in the center hole 10a of the winding part 55 of the coil 10 covers the first inner side lead-out wire 71b of the first air core coil 71 and the second inner side lead-out wire 72b of the second air core coil 72 whose tip end portions are connected with each other as shown by the chain line in FIG. 7. Further, the adhesive 58 filled in the center hole 10a of the winding part 55 of the coil 10 flows into a gap space between the first plate 12 and the plate part 40 of the coil holder 11, a gap space between the winding part 55 and the inner wall face of the coil arrangement hole 41, and a gap space between the second plate 13 and the plate part 40 of the coil holder 11 and, in addition, a gap space between the first air core coil 71 and the second air core coil 72.

Therefore, when the adhesive 58 is cured, as shown in FIG. 2, the adhesive layer 59 structured of the cured adhesive 58 is provided with the filling part 59a which is filled in the center hole 10a of the coil 10, the winding part fixing part 59b which fixes the winding part 55 to the plate part 40 of the coil holder 11, the first plate fixing part 59c which fixes the first plate 12 to the plate part 40 of the coil holder 11, the second plate fixing part 59d which fixes the second plate 13 to the plate part 40 of the coil holder 11, and a coil adhesion part 59e which adhesively bonds the first air core coil 71 to the second air core coil 72. In other words, the coil 10 is, as shown in FIG. 8, provided with the filling part 59a filled in the center hole 10a of the coil 10 and the coil adhesion part 59e which adhesively bonds the first air core coil 71 and the second air core coil 72 to each other. Further, the first inner side lead-out wire 71b of the first air core coil 71 and the second inner side lead-out wire 72b of the second air core coil 72 are sealed in the inside of the filling part 59a in a state that they are electrically connected with each other.

(Operations and Effects)

Figure 10:
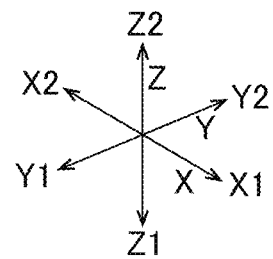
FIG. 10 is a perspective view showing a commonly used coil.
Figure 10:
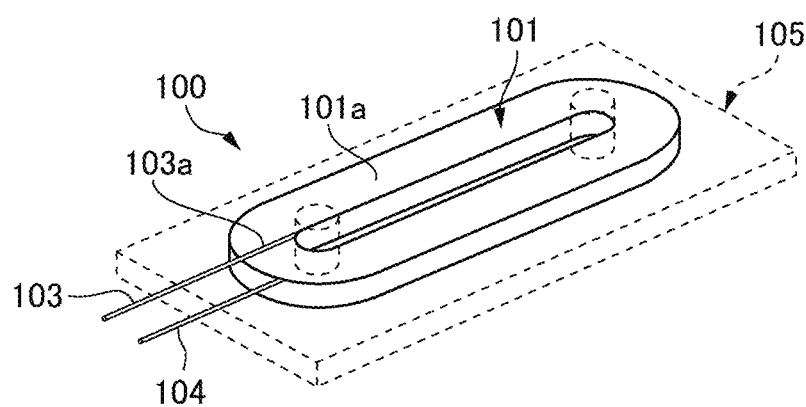

FIG. 10 is an explanatory view showing a manufacturing method of a commonly used coil. Commonly, a winding part 101 of a coil 100 is structured by winding a coil wire in a height direction and to an outer peripheral side around a jig 105 which determines a shape of its opening part. Therefore, as shown in FIG. 10, when the coil 100 is completed, a winding start portion 103 of the coil wire is located on an inner peripheral side of the winding part 101 and a winding end portion 104 is located on an outer peripheral side of the winding part 101. Accordingly, when the coil 100 is to be connected with a power feeding circuit board which is located on an outer peripheral side with respect to the coil 100, the winding end portion 104 can be extended as it is and connected with the power feeding circuit board. However, the winding start portion 103 is required to be extended from an inner peripheral side to an outer peripheral side along a surface 101a of the winding part 101. As a result, the winding start portion 103 is provided with a crossing portion 103a which is placed on and along the surface 101a of the winding part 101 from an inner peripheral side to an outer peripheral side.

In the magnetic drive mechanism 8, when a gap space between the winding part 101 of the coil 100 and the magnet 16 is set to be narrow, thrust for relatively moving the support body 3 and the movable body 5 can be increased. However, in a case that the winding start portion 103 of the coil wire is placed on and along the surface 101a of the winding part 101 of the coil 100, a gap space between the surface 101a of the winding part 101 and the magnet 16 is required to be separated from each other by an amount of the winding start portion 103 (crossing portion 103a).

On the other hand, in the coil 10 in this embodiment, as shown in FIGS. 5 and 9, both of the two wires, i.e., the first outer side lead-out wire 56 and the second outer side lead-out wire 57 (first outer side lead-out wire 71c and second outer side lead-out wire 72c) extended from the winding part 55 are extended from an outer peripheral side of the winding part 55. Therefore, two coil wires extended from the winding part 55 are to be connected with the power feeding circuit board 14 (power feeding board) which is located on an outer peripheral side with respect to the winding part 55, the coil wire is not required to extend along the surface of the winding part 55. Accordingly, in the magnetic drive mechanism 8, in comparison with a case that the conventional coil 100 is used, a gap space between the winding part 55 and the magnet 16 can be narrowed. As a result, thrust for relatively moving the support body 3 and the movable body 5 can be increased.

Further, the surface of the winding part 55 and the magnet 16 can be easily come close to each other and thus, a size of the actuator 1 can be reduced in a thickness direction of the coil 10 where the coil 10 and the magnet 16 face each other.

In addition, in this embodiment, the first air core coil 71 and the second air core coil 72 are structured so that a tip end portion of the first inner side lead-out wire 71b extended to an inner peripheral side from the first winding part 71a and a tip end portion of the second inner side lead-out wire 72b extended to an inner peripheral side from the second winding part 72a are electrically connected with each other. In other words, the first air core coil 71 and the second air core coil 72 are provided with respective lead-out wires which are extended to an inner peripheral side from the respective winding parts 55, and the tip end portions of the respective lead-out wires are electrically connected with each other. As a result, a length dimension of the first inner side lead-out wire 71b and a length dimension of the second inner side lead-out wire 72b can be sufficiently secured. Therefore, the first inner side lead-out wire 71b and the second inner side lead-out wire 72b are electrically connected with each other easily.

In this embodiment, the coil 10 includes the adhesive layer 59 provided with the filling part 59a, which is filled on an inner side of the first air core coil 71 and an inner side of the second air core coil 72, and the coil adhesion part 59e which exists between the first air core coil 71 and the second air core coil 72 to adhesively bond the first air core coil 71 and the second air core coil 72 to each other. The first inner side lead-out wire 71b and the second inner side lead-out wire 72b are sealed in an inside of the filling part 59a. Therefore, the first air core coil 71 and the second air core coil 72 are fixed and integrated with each other by the adhesive layer 59. Further, the first inner side lead-out wire 71b and the second inner side lead-out wire 72b whose tip end portions are connected with each other are sealed in the inside of the adhesive layer 59. Therefore, even when the movable body 5 and the support body 3 are relatively moved to generate vibration, the first inner side lead-out wire 71b and the second inner side lead-out wire 72b are prevented from going out from the center hole 10a of the winding part 55 of the coil 10 to interfere with the magnet 16 or the like.

Further, according to this embodiment, fixing of the winding part 55 of the coil 10 to the coil holder 11, sealing of the first inner side lead-out wire 71b and the second inner side lead-out wire 72b in the inside of the adhesive layer 59, and fixing of the first air core coil 71 and the second air core coil 72 are performed by the adhesive layer 59.

In addition, in this embodiment, the first air core coil 71 and the second air core coil 72 are the same air core coil 10. Therefore, a number of components of the air core coil 10 structuring the coil 10 can be reduced.

Modified Embodiments

In this embodiment, the first air core coil 71 and the second air core coil 72 may be air core coils 10 having different shapes. For example, a winding number of the first air core coil 71 may be different from that of the second air core coil 72.

Further, in the embodiment described above, two wires, i.e., the first outer side lead-out wire 56 and the second outer side lead-out wire 57 (first outer side lead-out wire 71c and second outer side lead-out wire 72c) extended from the winding part 55 are respectively extended to the "Y1" direction side. However, it may be structured that the first outer side lead-out wire 56 (first outer side lead-out wire 71c) is extended from the winding part 55 to the "Y1" direction side and the second outer side lead-out wire 57 (second outer side lead-out wire 72c) is extended to the "Y2" direction side.

In this case, the second air core coil 72 is overlapped with the first air core coil 71 in a state that the second air core coil 72 is turned by 180° in a winding direction around the center hole. Further, in this case, the power feeding circuit board 14 (power feeding board) includes a first power feeding board and a second power feeding board disposed on an opposite side to the first power feeding board with respect to the winding part 55, and the first outer side lead-out wire 71c is connected with the first power feeding board and the second outer side lead-out wire 72c is connected with the second power feeding board.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator comprising:
a movable body comprising a magnet;
a support body comprising a coil, a coil holder comprising a coil arrangement hole in which the coil is held, and a power feeding board with which two lead-out wires extended from a winding part of the coil are connected on an outer peripheral side with respect to the coil;
a connection body which connects the movable body so as to be movable relative to the support body;
a magnetic drive mechanism comprising the magnet and the coil, and relatively moving the movable body and the support body; and
an adhesive layer which fixes the winding part of the coil to the coil holder;
wherein the magnet faces the coil in a thickness direction of the winding part;
wherein the coil comprises:
a first air core coil comprising:
a first winding part;
a first inner side lead-out wire extended from the first winding part to an inner peripheral side; and
a first outer side lead-out wire extended from the first winding part to an outer side; and
a second air core coil comprising:
a second winding part whose winding direction is same as the first winding part and which is overlapped with the first winding part;
a second inner side lead-out wire which is extended from the second winding part to an inner peripheral side and whose tip end portion is electrically connected with a tip end portion of the first inner side lead-out wire; and
a second outer side lead-out wire extended from the second winding part to an outer side;
wherein the winding part comprises the first winding part and the second winding part;
wherein the first outer side lead-out wire and the second outer side lead-out wire are the two lead-out wires;
wherein the adhesive layer comprises:

a filling part which is filled in a center hole of the first air core coil on an inner side of the first winding part and filled in a center hole of the second air core coil on in an inner side of the second winding part; and a coil adhesion part which exists between the first air core coil and the second air core coil to adhesively bond the first air core coil to the second air core coil, and a winding part fixing part which exists between the winding part and the coil holder to fix the coil to the coil holder;

wherein the first inner side lead-out wire and the second inner side lead-out wire are sealed in an inside of the filling part; and wherein the support body comprises a plate which is overlapped with the winding part in the thickness direction of the winding part, and the plate is supported by the coil holder in a state that the filling part of the adhesive layer and the coil arrangement hole which holds the coil are closed by the plate.

2. The actuator according to claim 1, wherein the first air core coil and the second air core coil are a same air core coil.

3. The actuator according to claim 1, wherein the support body comprises a second plate which is supported by the coil holder so as to be overlapped with the winding part in the thickness direction of the winding part from an opposite side to the plate, the adhesive layer comprises a first plate fixing part which fixes the plate to the coil holder and a second plate fixing part which fixes the second plate to the coil holder, and the plate and the second plate are supported by the coil holder in a state that the filling part of the adhesive layer and the coil arrangement hole are closed from both sides in the thickness direction of the winding part.

* * * * *